United States Patent [19]

Tuthill

[11] 4,260,253

[45] Apr. 7, 1981

[54] PRECISION CELESTIAL POLE LOCATOR

[76] Inventor: Roger W. Tuthill, 11 Tanglewood La., Mountainside, N.J. 07092

[21] Appl. No.: 837,205

[22] Filed: Sep. 27, 1977

[51] Int. Cl.³ .................... G01B 11/27; G02B 23/00
[52] U.S. Cl. ....................................... 356/153; 350/83
[58] Field of Search ..................... 356/138, 150–151, 356/153; 350/83, 10, 85; 250/203 R; 33/268–269

[56] References Cited

U.S. PATENT DOCUMENTS 2,843,013  7/1958  Keuffel et al. ...................... 356/247
3,718,398  2/1973  Becraft et al. ...................... 356/255
3,840,284  10/1974  Rand ...................... 350/83

Primary Examiner—John K. Corbin
Assistant Examiner—Wm. H. Punter
Attorney, Agent, or Firm—H. Hume Mathews

[57] ABSTRACT

Apparatus and method for aligning telescopes with the axis of rotation of the earth, which utilizes a pole finder telescope having its optical axis offset from its mechanical axis by an angle which is equal to or a function of the angle by which the reference star is offset from the earth's axis of rotation at the time the alignment is being made.

5 Claims, 5 Drawing Figures

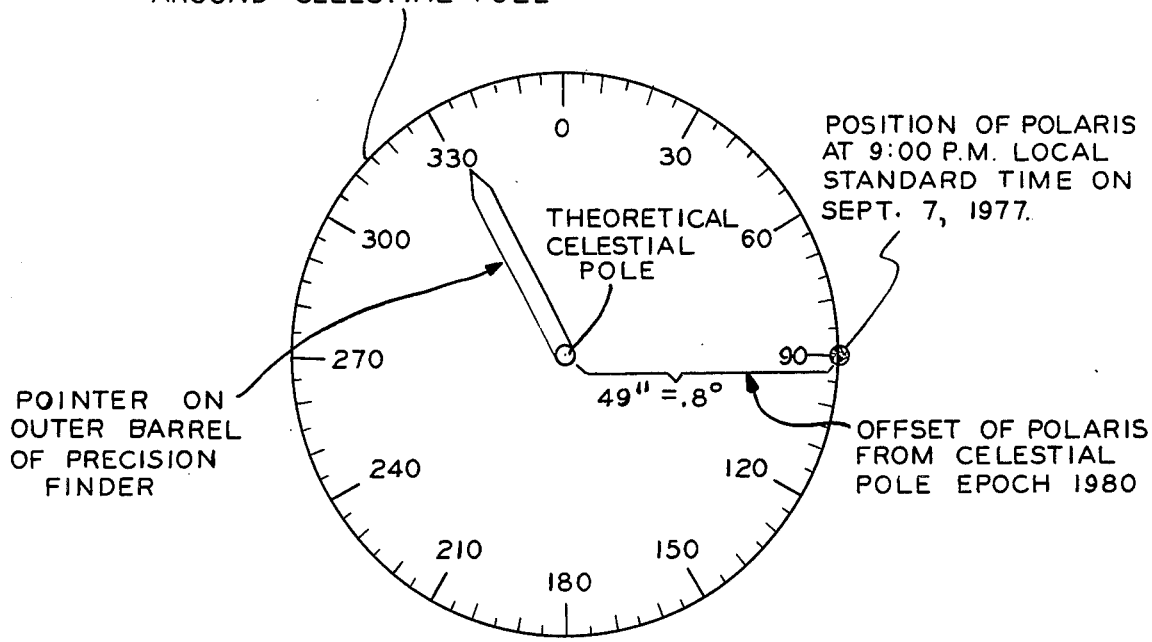

PRECISION CELESTIAL POLE LOCATOR

BACKGROUND OF THE INVENTION

Astronomical instruments, such as telescopes, when pointed at an object in the sky (i.e., a star) have a very small field of view. Because the earth is a rotating platform, any object in the field of view of a telescope which rotates with the earth does not stay there but very quickly moves out of the field of view. Therefore, most astronomical devices are rotated mechanically, in a direction opposite to the direction of the earth's rotation, to cancel the effect of the rotation of the earth so that any object in the field of view, or the area scanned by the device, will remain in said field of view or scanned area.

In order to have this mechanical motion accomplish its purpose it is essential that the axis of rotation of the astronomical device be accurately aligned with the axis of rotation of the earth, i.e., that the axis of rotation of the device be parallel to the axis of rotation of the earth, whatever the particular location on the earth's surface of the astronomical device. For instance, if the astronomical device were located at the North Pole (true north, not magnetic north) the axis of rotation of the astronomical device should be vertical, or co-incident with the earth's rotational axis. If the astronomical device were located at the equator of the earth, then the axis of rotation of the astronomical device should be horizontal, pointing in the direction of true north and parallel to (although spaced approximately 4000 miles therefrom) the axis of rotation of the earth. In view of the enormous distances of the stars and other objects in space viewed through telescopes from the earth, this 4000 mile spacing is insignificant and can be neglected in solving the problem which is the subject of the present invention.

At any point between the equator and the North Pole the axis of rotation of the astronomical device would be tilted, i.e., neither vertical nor horizontal with respect to the earth's surface at that point, to an extent corresponding to the latitude at that point, with the direction of pointing again being true north so that the axis of rotation of the device will be parallel to the earth's axis of rotation.

Because it is essential that the astronomical device track accurately the object in space being viewed, even though the device is rotating constantly with the earth, it is necessary that its axis of rotation be very carefully and accurately pointed in the right direction. While it is easy to accurately find the precise latitude of the location where the astronomical device is positioned, it is not easy to point it accurately, or precisely, to true north.

In permanently located instruments this has been accomplished by empirical means, using the drift of stars in the field of view to test the accuracy of pointing. Although this method is effective, it takes a long period of time to accomplish. Therefore, although it may be suitable for permanent installation it is not an acceptable solution to the problem for those installations which are portable, or temporary, or installations that are moved from place to place, or where for any reason quick, as well as accurate, alignment is required.

The precise location of the Celestial Pole (the pole in space through which passes the axis of the earth's rotation) in either hemisphere is not easy to find. There is no bright star located on either pole location.

However, there is in the Northern Hemisphere a star known by the name Polaris (and there are somewhat similar stars in the Southern Hemisphere) which is close to the Celestial Pole, the distance of separation being 49 minutes of arc in the year 1980. The angular distance of Polaris from the Northern Celestial Pole is constantly changing (about three minutes of arc per ten years of time) due to the precession of the earth's axis of rotation. Nevertheless, the location of Polaris relative to the Northern Celestial Pole can be determined, at any particular time, and therefore it can be used as a reference, or base, from which one can accurately locate the Northern Celestial Pole.

It is not satisfactory to use Polaris itself as the theoretical Celestial Pole in any astronomical installation which requires precision in alignment, for example where prolonged viewing or photographing procedures are involved. Although Polaris has been found satisfactory as a reference point or base from which one can accurately locate the Celestial North Pole, Polaris itself cannot satisfactorily be used as if it were, or is assumed to be, the same as the Celestial North Pole.

Nearly all telescopic equipment is provided with an auxiliary telescope for pointing the main telescope. The auxiliary telescope has a smaller aperture, and a larger field of view, than the main telescope. It is therefore easier to find objects in the sky with auxillary telescopes. Such auxillary telescopes are usually equipped with a reticle for accurately defining the center of the field of view, which is coaxial with the field of view of the main, larger telescope. These auxillary telescopes are known as finders.

Attempts have been made in the past to use finder telescopes to locate the Celestial Pole. To do this, the finder telescope is equipped with a circular reticle, calculated to be the correct diameter for the optics involved to correspond to the circular path of Polaris as it appears to rotate due to the rotation of the earth. If one of these finders, so equipped with a circular reticle, is positioned to be parallel to the axis of rotation of the astronomical device on which it is mounted, then Polaris, when located on the path of said circular reticle, and in the proper position on said path, will serve as a proper reference for aligning the astronomical device with the Celestial Pole. However, this method has disadvantages in that the correct position of Polaris on the circular reticle is hard to judge accurately. The position of Polaris is constantly changing with the diurnal motion of the earth as well as with the precession of the earth's axis of rotation.

SUMMARY OF THE INVENTION

According to the present invention, astronomical telescopes and other astronomical devices can quickly, accurately and precisely be aligned with respect to the Celestial Pole by an apparatus and a method which are quite different and work much better than the prior art apparatus and methods referred to above.

In the present invention, a precision pole finder, equipped with a simple reticle crosshair, and which has its optical axis adjustably offset with respect to its mechanical axis is used to align the axis of rotation of the astronomical device with the axis of rotation of the earth. The optical axis of the pole finder is preset to the precise angular distance between the position of Polaris and the Celestial Pole, and provided with a calibrated circular protractor and an indicator to enable the plane formed by said optical and mechanical axes of the pole finder to be angularly aligned with the plane formed by the line of sight from the earth to Polaris and the line (axis) of the earth's rotation.

The angle between the optical axis of the pole finder and the mechanical axis of the pole finder is made adjustable. This enables the said angle to be precisely set to equal the angle between Polaris and the Celestial Pole at the time the observation is being made. Precession of the earth's axis of rotation changes the angle between that axis and Polaris continuously but the said angle can be determined (simply by looking it up in a table) for any given time. By adjustment of the finder, its optical axis can be precisely set at the same angle with respect to its mechanical axis as the angle between Polaris and the axis of the earth's rotation, for the particular moment in time at which the observation is to be conducted.

For example, in the year 1980, the angular distance between Polaris and the earth's axis of rotation will be 49 minutes of arc. If the pole finder of the present invention were to be used during that year, according to the method of the present invention, the pole finder would be mounted on the tripod of the astronomical device (usually a telescope) so that its mechanical axis is parallel to, or co-incident with, the axis of rotation of the telescope, about which it is rotated during observations. Using a chart (known in the art) which shows the orientation of Polaris with respect to the Celestial Pole at the time of day and the date on which the observation is being made, the indicator of the pole finder is set with respect to the calibrated circular protractor so that the plane formed by the optical axis and the mechanical axis of the pole finder will have the same orientation as that of Polaris at that particular time. Once these settings are made, the observer looks through the pole finder and points it so that Polaris is located on the intersection of the cross-hairs of the finder; in other words, the optical axis of the finder is made to point directly at Polaris. With such a setting of the finder, its mechanical axis will be positioned precisely parallel to the axis of the earth's rotation. Since the mechanical axis of the finder has previously been made parallel to or co-incident with the axis of rotation of the telescope, the axis of rotation of the telescope will also be precisely positioned parallel to the axis of the earth's rotation and when rotated about said axis at the proper rate of rotation will maintain a stationary field of view with respect to the object in space at which it is pointed, without any relative motion.

DESCRIPTION OF DRAWINGS

In the drawings:

FIG. 4 is a sketch showing the circular path of Polaris relative to the Celestial Pole, as the earth rotates on its axis. The position Polaris would have at 9:00 p.m. on Sept. 7, 1977, on this path is illustrated, and its angular offset from the Celestial Pole during the Epoch 1980 is also shown. The indicator or pointer on the pole finder is also shown, although set in a different position than it would be set for an observation to be taken at 9:00 p.m. on Sept. 7th. For an observation to be taken at 9:00 p.m. local standard time on Sept. 7, 1977, the pointer would be set to match the orientation of Polaris relative to the Celestial Pole at that time, namely at 90°.

FIG. 5 is a sketch showing how the optical axis of the pole finder of this invention is offset angularly with respect to its mechanical axis, the amount of such offset being 49" of arc for the Epoch 1980. The pole finder is provided with an adjustment so that the angle of offset may be varied, and selected, to match the separation of Polaris from the Celestial Pole for different Epochs.

DETAILED DESCRIPTION OF PREFERRED EMBODIMENT

In the presently preferred embodiment of the invention, shown in the accompanying drawings, the invention is shown as applied to a reflector type telescope 10 having an eyepiece 12 and a line of sight, or optical axis 14. A simple view finder scope 17 is provided for sighting purposes, to point the telescope in the direction of the object in space to be observed through the telescope.

Figure 1:
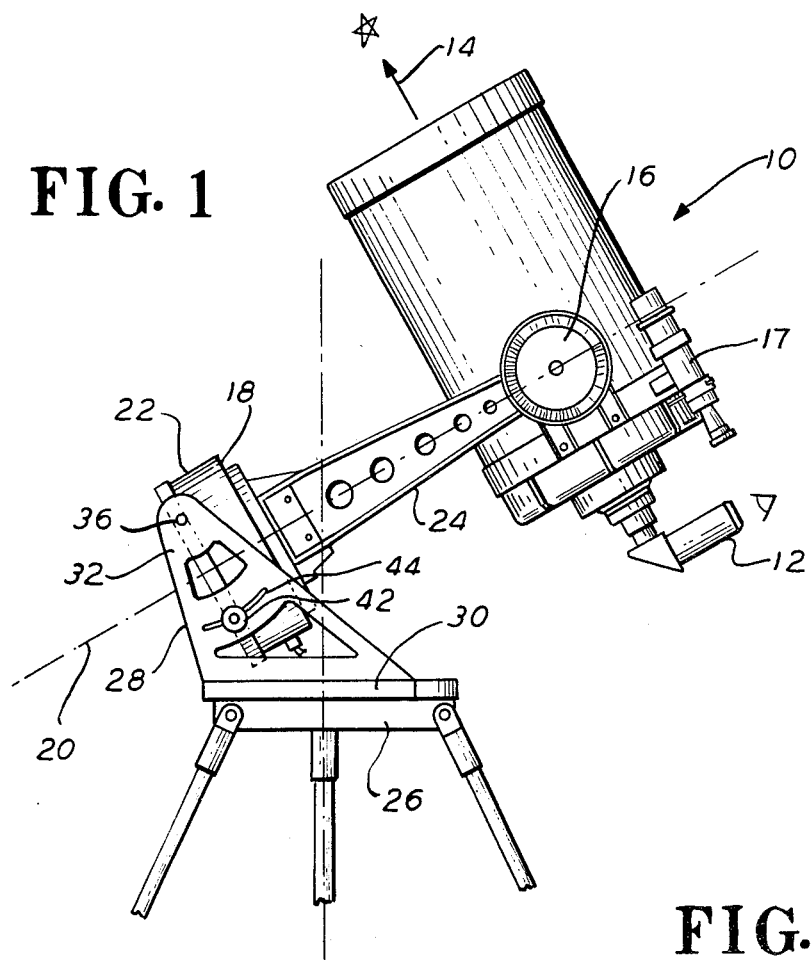
FIG. 1 is a front elevational view of an astronomical telescope mounted on a tripod and having a clock drive for rotating the telescope about an axis that may be located parallel to the earth's axis of rotation, at the same rate but in the opposite direction with respect to the earth's rotation.

The telescope shown in FIG. 1 is of a conventional type, having a declination setting circle 16 for setting the instrument about its declination axis (passing through the center of declination circle 16 and extending perpendicularly to the plane of the drawing) and a right ascension setting circle 18 for setting the instrument about its right ascension axis 20. A clock drive 22 is provided to rotate the instrument about axis 20, at the same rate of rotation as that of the earth but in the opposite direction.

Figure 3:
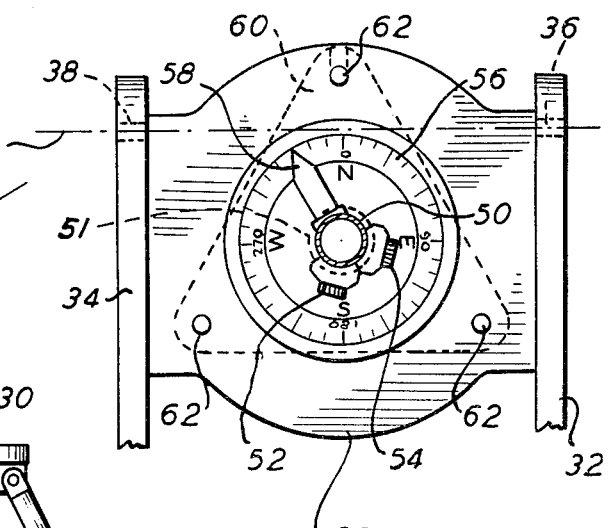
FIG. 3 is an enlarged view along the lines 3—3 of FIG. 2.

Clock drive 20, connected to the telescope by supporting arms 24, one of which is shown in FIG. 1, and the other of which lies behind and is positioned parallel to the arm 24 appearing in FIG. 1, is in turn supported on a tripod 26 by a wedge 28, in the form of a base 30 bolted to the top of the tripod and having a yoke consisting of two generally triangular arms 32, 34 (see FIG. 3) which extend upwardly from the base 30 in spaced, parallel relationship to each other. The clock drive 20 is pivotally connected to arms 32, 34 by pivot pins 36, 38 for adjustment about the axis 40 passing through the pivot points. The clock drive is also adjustably connected to the arms 32, 34 by a bolt and slot connection 42, 44, to enable the drive (and therefore the telescope) to be moved angularly about pivots 36, 38 (i.e., about axis 40) a limited amount (to the extent provided by the length of adjustment slot 44) and then secured and fixed in the desired adjusted position by tightening bolt 42.

Thus, the telescope as shown in FIG. 1, once sighted on the desired object in the sky by finder telescope 17 and its mount adjusted so that the axis of rotation 20 of the clock drive is positioned parallel to the axis of rotation of the earth, will continue to maintain a fixed sighting position relative to the object if the clock drive is engaged to rotate the telescope about axis 20 at the same rate of rotation as that of the earth but in the opposite direction of rotation.

The invention of the present application, a presently preferred embodiment of which is illustrated in FIGS. 2 through 5, enables the axis of rotation of the clock drive 22 in FIG. 1 to be readily, quickly and precisely aligned with the earth's axis of rotation.

Figure 2:
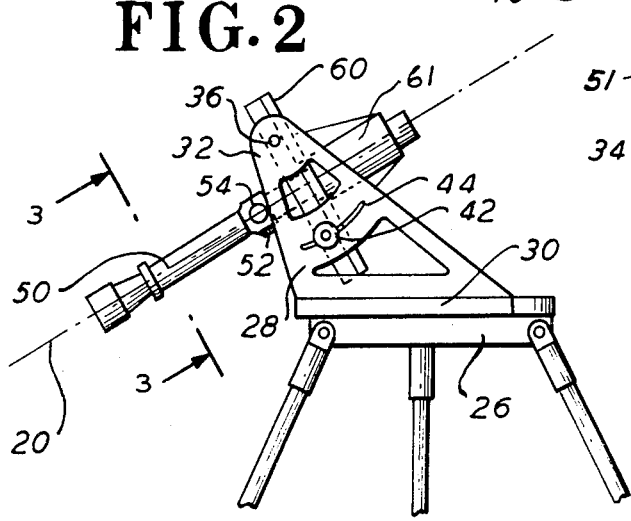
FIG. 2 is a front elevational view like FIG. 1, but with the pole finder of this invention being attached to the tripod in the same mounting which will receive the main telescope, in the same place as the pole finder.

FIG. 2 illustrates the precision pole finder which, when employed according to the invention, will enable the axis of rotation 20 in FIG. 1 to very precisely, quickly and readily be aligned exactly parallel to the earth's axis of rotation, no matter what the location on the earth's surface that the observation is being carried out or at what particular moment in time the observation is being made.

In FIG. 2, the telescope and its clock drive has been removed from the wedge 28. In place thereof the pole finder 50 of the present invention has temporarily been installed. This pole finder consists of a special sighting telescope having adjustments 52, 54 for angularly shifting its optical axis relative to its mechanical axis, and a rotational mount including a calibrated dial 56 and an indicator 58 for setting the plane formed by said optical axis and mechanical axis at a preselected angular position about the axis 20.

The pole finder 50 and its calibrated dial and indicator are mounted on the wedge 28 in exactly the same position the clock drive of the telescope would be mounted in carrying out an observation, with the mechanical axis 20 of the pole finder scope being the same as, or co-incident with, the axis of rotation 20 of the clock drive. The pole finder is secured to wedge 28 by a generally triangular mounting plate 60, attached by bolts 62 to the cross plate of wedge 28. As previously stated, the arrangement is such that the mechanical axis of the pole finder, when the pole finder is mounted on the wedge, is in exactly the same position, i.e., is the same, as the axis of rotation of the clock drive 22 when the telescope and its clock drive are mounted on the wedge.

The telescope barrel of the pole finder 50 is rotatably mounted in a projection 61 extending outwardly from the mounting plate 60, at right angles thereto. An annular bearing 51 may be provided between the projection and the barrel, if desired, or the telescope barrel may simply be mounted with a rotatable friction fit in the bore hole of projection 61, so that it can be turned by hand to a selected angular position wherein it will be retained by friction between outer wall of the barrel and the inner wall of the bore through projection 61.

The pole finder 50 may be turned about its mechanical axis 20 by grasping indicator or pointer 58 attached to the barrel and rotating it to whatever angular position may be desired, as shown by the position of pointer 58 relative to the calibrated card 56. This card is marked off with markings like those of a compass, in one degree intervals totaling 360° for one revolution.

The circular path of Polaris relative to the Celestial Pole, as seen from the earth during a single revolution of the earth, is shown in FIG. 4. For the Epoch 1980, the angular spacing of the position of Polaris from the earth's axis of rotation will be 49", or 8° of arc. If the path is calibrated in degrees as shown, and oriented (for example with its 0/360° mark vertical or "up"), then the angular position of Polaris on this path can be calculated for any particular time of day. For example, at 9:00 p.m. local standard time on Sept. 7, 1977, Polaris was located at the 90° mark on the said path, or due East. Its angular position along said path at any other time of day, on any particular day, can also be determined. For example, the orientation of Polaris along said path (FIG. 4) is as follows for the year 1977:

| Jan. 17 | 330 | degrees |
| Feb. 7 | 300 | " |
| Mar. 7 | 270 | " |
| Apr. 7 | 240 | " |
| May 7 | 210 | " |
| June 7 | 180 | " |
| July 7 | 150 | " |
| Aug. 7 | 120 | " |
| Sept. 7 | 90 | " |
| Oct. 7 | 60 | " |
| Nov. 7 | 30 | " |
| Dec. 7 | 0 | " |

When the pole finder is installed on the wedge 28, its mechanical axis 20 is positioned co-incident with the axis of rotation 20 of the clock drive 22. However, the optical axis (line of sight) of the special telescope is offset angularly from the mechanical axis as shown in FIG. 5. This angle can be varied, and selected, in a known manner by adjusting knobs 52, 54, in the same manner as the windage and elevation settings of a rifle telescope may be adjusted. For use during Epoch 1980, these settings would be made so that the optical axis of the pole finder telescope is angularly offset from the mechanical axis by 49", to match exactly the offset of Polaris from the Celestial Pole during that Epoch.

OPERATION

In operation of the preferred embodiment of the pole finder shown in the drawings, in a location on the mainland of the United States, the tripod 26 is set up and oriented around its vertical axis (shown in FIG. 1) so that the pole finder telescope can by adjustment about pivots 36, 38 be pointed at Polaris, with the "N" or north marking on calibrated dial 56 in the vertical, or "up", position. The pole finder telescope has previously been adjusted, by knobs 52, 54, so that its optical axis is angularly offset from its mechanical axis by 49" of arc. It is so mounted on wedge 28 that its mechanical axis is exactly aligned, or co-incident with, the position of the axis of rotation of the clock drive 20 when the telescope and clock drive are mounted on wedge 28, after the alignment operation has been completed and the pole finder telescope is removed from wedge 28.

Pointer or indicator 58, and the pole finder telescope barrel attached thereto, are then rotated to the particular orientation that Polaris has, in its relative rotation about the Celestial Pole, at the time the observation is being made. The pointer is so positioned as to be in the plane formed by the optical axis and the mechanical axis of the special finder telescope. Therefore, when the pointer is oriented to match the orientation of Polaris at the time the observation is made, the optical axis of the special finder telescope will similarly be so oriented.

Pole finder telescope is then sighted to place the intersection of the crosshairs forming its reticle directly on Polaris, and the wedge adjustment bolts 42 are tightened to lock the wedge in that position with the optical axis of the pole finder telescope passing through Polaris. In that position, the mechanical axis of the pole finder telescope will be exactly parallel to the axis of rotation of the earth. Pole finder telescope 50 is then removed from the wedge 28, and the clock drive and the telescope placed on the wedge bolted thereon in the same position, with the axis of rotation of the clock drive being in the same position as was the mechanical axis of the pole finder telescope.

By means of the view finder telescope 17, the main telescope 10 is then adjusted about its declination and ascension axes until its field of view is centered on the object in the sky to be viewed, and the clock drive is engaged. Thereafter, the main telescope will be rotated by the clock drive about the earth's axis of rotation, at the same rate of rotation as that of the earth but in the opposite direction. The main telescope field of view will thus be maintained fixed with respect to the object in the sky on which it is pointed.

Although in the embodiment of the invention shown in the drawing the Celestial Pole is located by first placing the pole finder on the mount for the main telescope and then, after the Celestial Pole has been located, removing the pole finder from the said mount and placing the main telescope on the mount in the same position that had been occupied by the pole finder, the invention is not limited to such an arrangement. If desired, the pole finder can be attached to the clock drive 22, or the supporting arms 24 in FIG. 1, with its mechanical axis parallel to the axis of rotation of the main telescope. With such an arrangement, the operation as previously described for locating the Celestial Pole is carried out as stated above, except that the entire astronomical apparatus remains mounted on the tripod during the finding operation, and when Polaris is sighted so as to lie on the optical axis of the pole finder, with the optical axis of the pole finder being in the same orientation around the earth's axis of rotation as Polaris is at the time of observation, then the mechanical axis of the pole finder and the axis of rotation of the main telescope will both be aligned, i.e., made parallel with the earth's axis of rotation.

I claim:

1. A device for aligning the axis of rotation of an astronomical instrument with the earth's axis of rotation comprising, a finder having its optical axis angularly offset with respect to its mechanical axis by an angle equal to the angular offset of a reference star from the Celestial Pole, means for rotating the plane formed by said optical and mechanical axes to match the orientation of said reference star about the Celestial Pole, and means for aligning said optical axis with said reference star.

2. A method for aligning the axis of rotation of an astronomical instrument with the axis of rotation of the earth comprising, establishing a mechanical axis parallel to the axis of rotation of said instrument, establishing an optical line of sight at an angle to said mechanical axis equal to the angular offset of a reference star from the Celestial Pole at the time at which the alignment is to be made, orienting the said optical axis so that it matches the orientation of the reference star relative to the Celestial Pole at the time the alignment is to be made, and placing the optical axis in alignment with the reference star.

3. In an astronomical instrument which is rotatable about an axis which is to be positioned parallel with the earth's axis of rotation, a finder device having an optical axis adapted to be angularly displaced with respect to the axis of rotation of said instrument by an angle which is equal to the angular displacement of a selected reference star, from the earth's axis of rotation at the time the finder device is being used, means for orienting said optical axis with respect to the axis of rotation of said instrument to place it in the same orientation with respect to said axis as the orientation of said reference star with respect to the axis of rotation of the earth at the time the finder device is being used, and means for moving said optical axis and said axis of rotation of the instrument while maintaining them in said relative positions with respect to each other until said optical axis passes through said reference star, thus placing the axis of rotation of the instrument parallel to the axis of rotation of the earth.

4. A device according to claim 1, in which the finder device is provided with adjustment means for moving its optical axis to a predetermined angular position with respect to its mechanical axis.

5. An astronomical pole finder for precisely locating the position of the Celestial Pole comprising, a finder telescope having its optical axis adjustably offset with respect to its mechanical axis, means for rotating said finder telescope about its mechanical axis to a preselected angular position, and indicator means for setting said finder telescope in that angular position which corresponds to the orientation of the star Polaris in its path around the Celestial Pole at the time the pole finder is being used to locate the Celestial Pole.

* * * * *